Nov. 7, 1967  W. WOSTBROCK  3,350,952
ARRANGEMENT FOR CONVEYING POWER IN A PLAY-FREE MANNER FROM
THE MAIN DRIVE OF CHIP-REMOVING MACHINE TOOLS
Filed Aug. 10, 1964  3 Sheets-Sheet 1
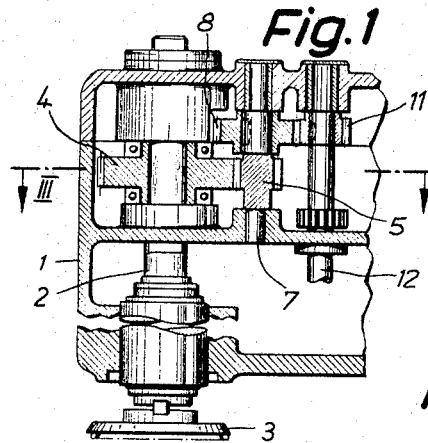
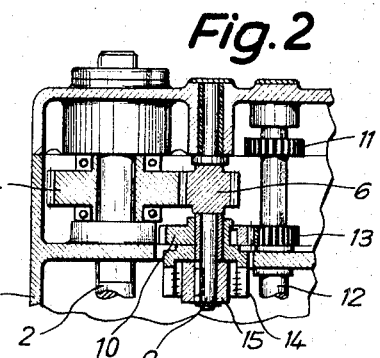
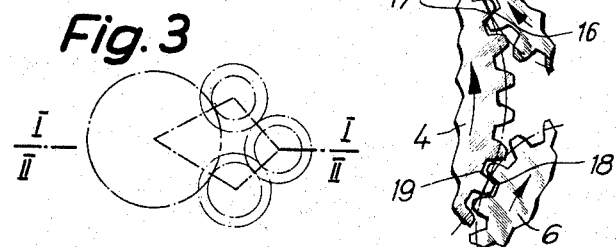
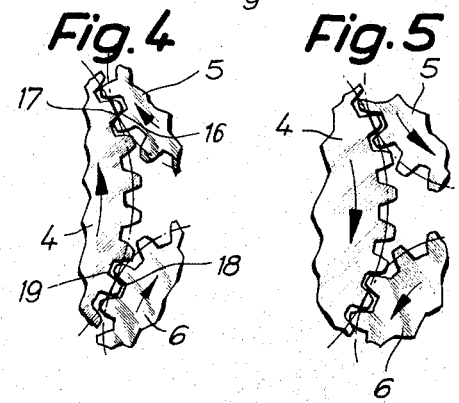
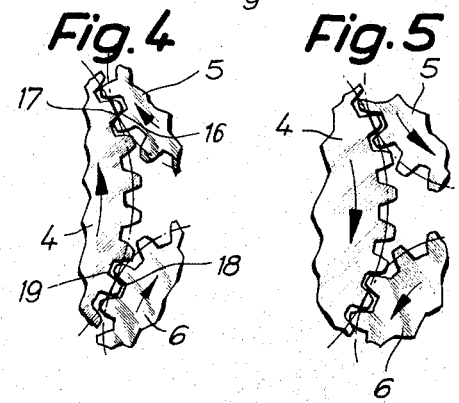
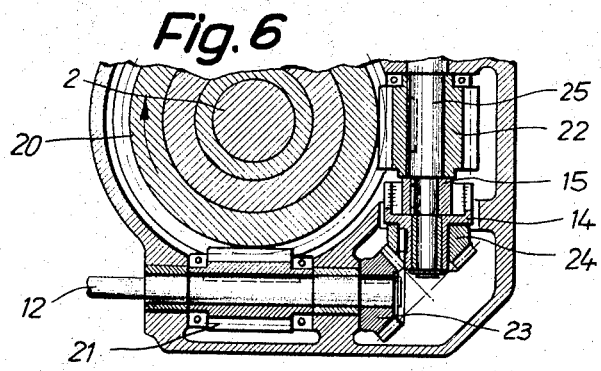
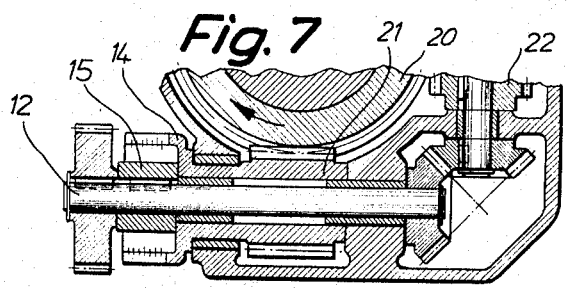
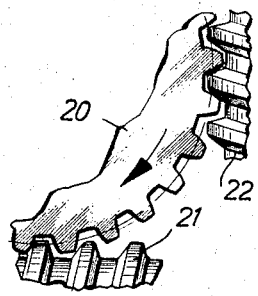

Nov. 7, 1967  W. WOSTBROCK  3,350,952
ARRANGEMENT FOR CONVEYING POWER IN A PLAY-FREE MANNER FROM
THE MAIN DRIVE OF CHIP-REMOVING MACHINE TOOLS
Filed Aug. 10, 1964  3 Sheets-Sheet 2
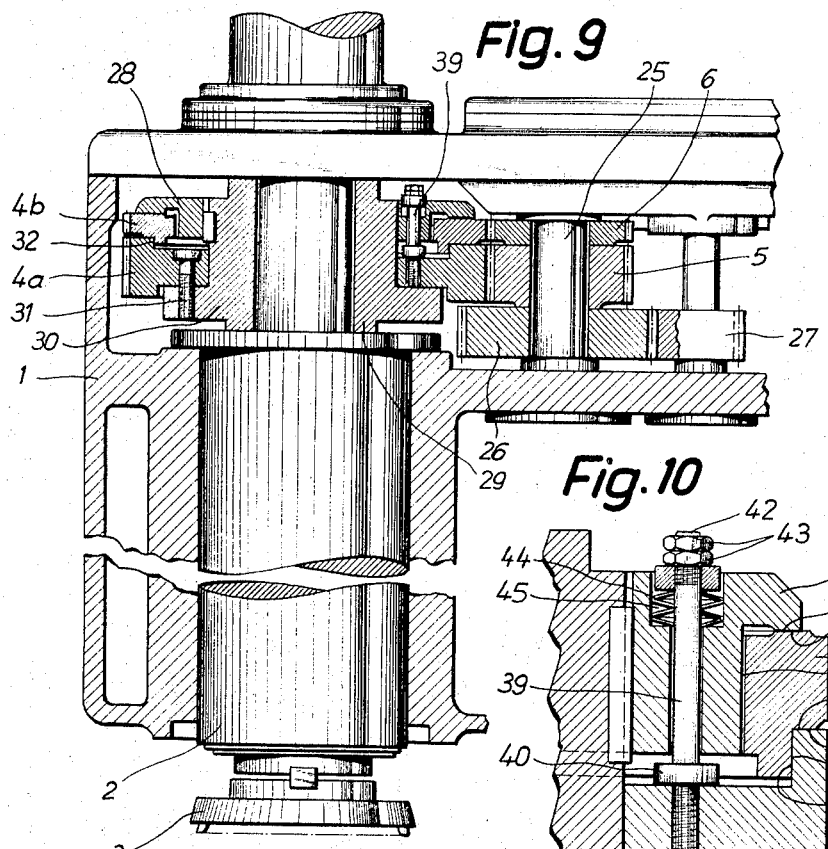
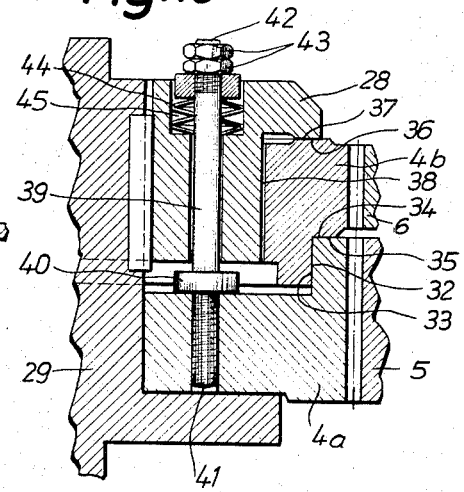
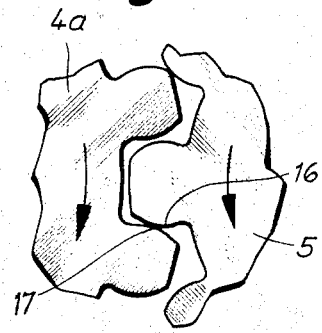
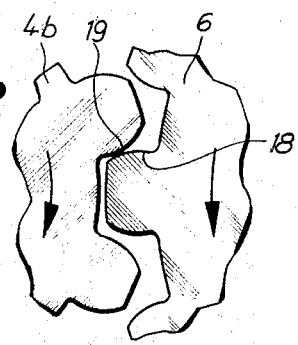

Nov. 7, 1967  W. WOSTBROCK  3,350,952
ARRANGEMENT FOR CONVEYING POWER IN A PLAY-FREE MANNER FROM
THE MAIN DRIVE OF CHIP-REMOVING MACHINE TOOLS
Filed Aug. 10, 1964  3 Sheets-Sheet 3

United States Patent Office 3,350,952
Patented Nov. 7, 1967

3,350,952
ARRANGEMENT FOR CONVEYING POWER IN A PLAY-FREE MANNER FROM THE MAIN DRIVE OF CHIP-REMOVING MACHINE TOOLS
Werner Wostbrock, Remscheid, Germany, assignor to Fritz Hurxthal K.G. Maschinenfabrik, Remscheid, Germany
Filed Aug. 10, 1964, Ser. No. 388,387
Claims priority, application Germany, May 8, 1964, H 52,623
10 Claims. (Cl. 74—409)

The present invention relates to an arrangement for conveying power in a play-free manner from the main drive of chip-removing machine tools with rotating work piece or tool carrier, especially machine tools working with hard metallic or ceramic cutting material.

While the main drive wheel of machine tools of the above-mentioned type can easily be connected to the main spindle so that in circumferential direction it will operate without play, the meshing of the driving gear with the teeth of the main drive causes difficulties in view of the unavoidable flank play of the teeth. This play, which may amount to some hundredths of a millimeter, has its origin, as is well known, in the manufacturing tolerances of the teeth and in the heating-up of the teeth. This play is higher with worm wheel drives than it is with spur gears because usually, the worm wheel is made of steel whereas the worm gear ring consists of bronze, which, however, has a considerably higher expansion factor than steel.

Attempts have been made to overcome these difficulties by having two worms operate in common on one and the same worm wheel while journalling one of said worms so that it can be adjusted axially. However, also in this instance, a certain play has to be maintained because, with increasing load during the machining operation, the temperature of the worms and worm wheel will vary.

One possibility of producing such a worm drive without play consists in that one of the two worms operating in common with the worm wheel is axially clamped, for instance by a packet of dish springs, in such a way that this worm will be pressed against the teeth of the worm wheel in a direction opposite to that in which the other worm is pressed. This solution, however, has the drawback that the clamping force must be rather high which, in turn, brings about a higher temperature and considerable wear of the worms and worm wheel and also considerable loss in energy.

Similar remarks apply to heretofore known power transmissions in which the spur gear teeth of a main drive gear mesh with two identical spur gears of which the first gear is pressed against the main drive gear in a direction opposite to that in which the other gear is pressed, in order to eliminate the flank play which exists between the second gear and the main drive gear. This back pressure will be obtained by clamping the two spur gears against each other by a spring force acting in tangential direction. These clamping pressures, however, must be rather high, at least must have such a magnitude that they will overcome the maximum gear pressure occurring on the main drive gear. Therefore, they are subjected to high temperatures, and the spur gear and main drive gear wears rapidly while a considerable loss in efficiency is unavoidable. In addition thereto, it should be mentioned that under unfavorable working conditions in the main drive, vibrations may occur which under certain circumstances work themselves up and thus defeat the very purpose of avoiding vibrations and shocks in the main drive.

It is, therefore, an object of the present invention to provide an arrangement for conveying power in a play-free manner from the main drive of chip-removing machine tools with rotating work piece or tool, which will overcome the above-mentioned drawbacks.

It is another object of this invention to provide an arrangement for a play-free conveying of power from the main drive of chip-removing machine tools, which will not have to rely on clamping forces in the teeth and which will work shock and vibration-free.

It is another object of this invention to provide an arrangement as set forth in the preceding paragraphs which will be simple in construction and reliable in operation.

These and other objects and advantages of the invention will appear more clearly from the following specification in connection with the accompanying drawings, in which:

FIGURE 1 is a vertical longitudinal section of an arrangement according to the present invention, said section being taken along the line I—I of FIGURE 3;

FIGURE 2 is a vertical longitudinal section of the arrangement of FIGS. 1 to 3, said section being taken along the line II—II of FIGURE 3;

Figure 13:
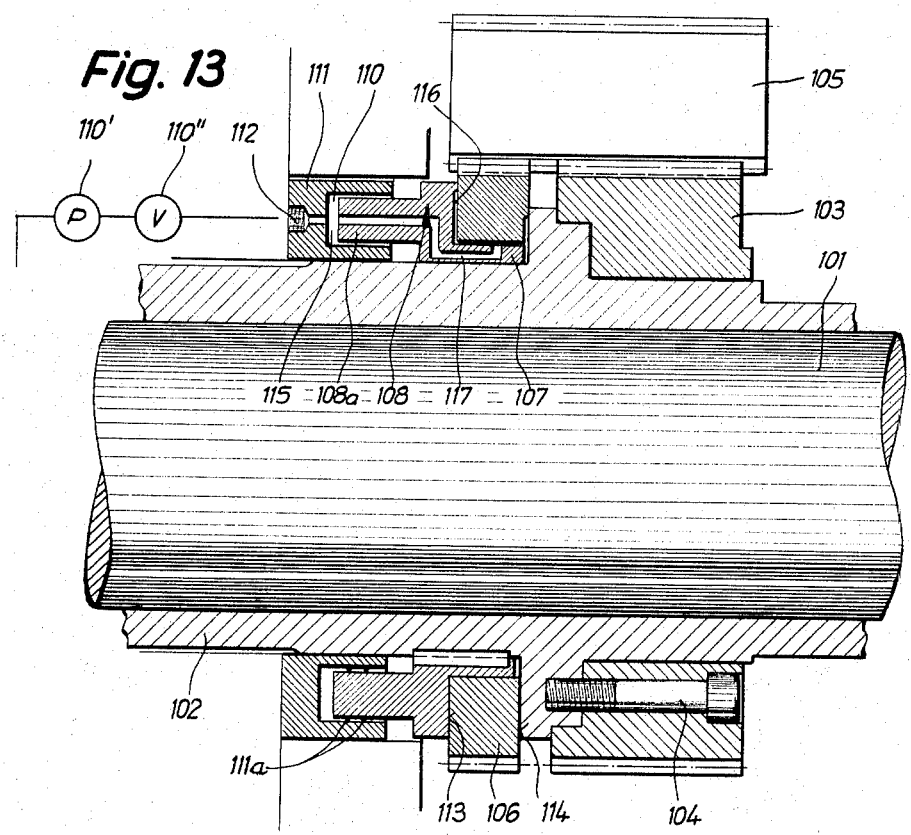
Figure 14:
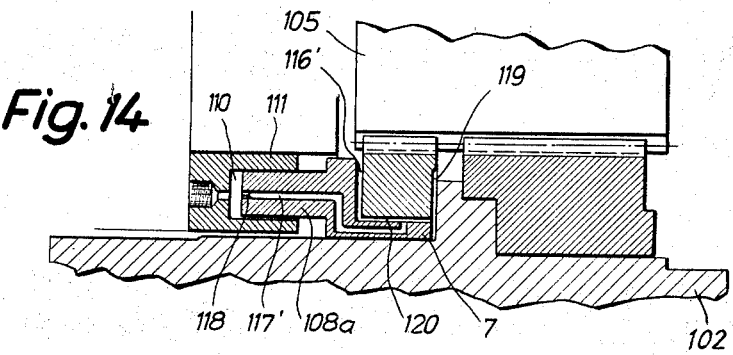

FIGURE 3 diagrammatically illustrates a section along the line III—III of FIGURE 1;

FIGURES 4 and 5 illustrate on a somewhat larger scale than FIGS. 1 to 3, the meshing conditions of the driving wheels in different directions of rotation;

FIGURE 6 represents a second embodiment of the present invention, and more specifically illustrates a section through an arrangement of the invention with a worm wheel drive;

FIGURE 7 is a section similar to that of FIGURE 6 but showing an arrangement according to the invention with a different worm wheel drive;

FIGURE 8 illustrates the meshing condition of the gears for the embodiment of FIGURE 7;

FIGURE 9 illustrates a vertical longitudinal section through the main spindle of a machine tool with a further embodiment of the invention;

FIGURE 10 illustrates a portion of FIGURE 9 but on a larger scale than the latter;

FIGURES 11 and 12 diagrammatically illustrate the meshing conditions between the teeth of a pinion and of gear rings pertaining to the embodiment of FIGURES 9 and 10;

FIGURE 13 is a section through still another embodiment of the invention;

FIGURE 14 shows a modified drive for a drilling spindle with spindle sleeve of a boring mill for use in connection with the arrangement of FIGURE 13.

The present invention is characterized primarily in that the transmission ratio between the main drive gear and one of the gears meshing therewith slightly differs, viz. within, for instance 1%, from the corresponding ratio to the other gear meshing with the main drive gear. The invention is furthermore characterized in that the difference in speed thus obtained is compensated for by a slip connection, for instance a disc clutch. An arrangement of this type has proved highly useful for large milling machines, boring mills, or other chip-removing machine tools with rotating work piece or tool carrier.

Gear pairs with slightly differing speeds of rotation, i.e. with only slightly differing numbers of teeth of the gears of each pair, and the compensation of the speed differences by a friction clutch, are known per se. Thus, in connection with cam shaft drives of internal combustion engines, it is known to employ this means in order to avoid chattering noises which were created during the operation by the fact that the valve springs of internal combustion engines cause the cam shaft to run ahead of the driving gears therefor when the highest valve position has been exceeded.

The above-mentioned means has also been employed in order with reciprocatory hydraulic carriages or turntables of machine tools, to prevent clamping during the return movement. Finally, the above-mentioned means has also been made use of in copying grinding machines, in order when grinding non-round work pieces to prevent a deviation from the theoretical curved shape.

All of the above employment fields and arrangements have not been able to suggest the present invention because the problems to be solved in the above-mentioned instances have no relationship to the problem to be solved with the present invention.

According to a further embodiment of the invention, the gearing of the main drive gear may be formed by two separate coaxial gear rings which are rotatable relative to each other through the intervention of a slip connection, each of said gear rings meshing with a respective pinion. In this connection, there exists the possibility of rigidly connecting both pinions to a common shaft, and furthermore, to emply herring-bone gearing by arranging one pinion at an incline upwardly while arranging the other pinion at an incline downwardly. Moreover, the slip connection may be so arranged on the main spindle that it is easily accessible from above.

According to another embodiment of the invention, the slip connection may be in the form of an annular piston adapted to be actuated by a hydraulic pressure medium. In this way, those frictional forces are eliminated which automatically occur between a stationary part and a rotating part. The pressure medium in front of the end face of the annular piston thus simultaneously forms the adjusting means for the pressure for the slide bearing for the annular piston relative to the stationary annular chamber.

Advantageously, the ring is provided with an annular bearing flange for the gear to be braked. The pressure medium by means of which the ring is adjusted passes as lubricant for said gear to the running and sliding surfaces thereof. The annular chamber communicates through bores of said ring with sliding surfaces of the gear. It is of particular advantage with this arrangement of the invention, to connect the annular chamber with the interior of the transmission housing and to cause the oil pressure in said housing to act upon the annular piston. In this way, by controlling the oil pump of the transmission housing, it is possible also to vary the pressure on the annular piston without the necessity of an additional oil pump or addition conduit means.

The control of the oil pressure in the annular chamber may be effected by a control for the adjustment of the speed but may also be independent thereof, in conformity with the tool diameter or the cutting conditions. Control means may, of course, be provided in the connection between the annular chamber and the pressure fluid source, or the interior of the transmission housing. If the pressure in the annular chamber is determined by the pressure medium in the transmission housing, control means may be interposed between the interior of the transmission housing and the annular chamber. Thus, the present invention makes it possible, as desired, to vary the oil pressure in the transmission housing itself or to permit the pressure in the transmission housing to assume a certain magnitude, and to vary the pressure in the transmission housing through control devices, in conformity with the pressure desired in the annular chamber.

Referring to the drawing in detail, and the embodiment of FIGS. 1 to 5 thereof in particular, the arrangement shown therein comprises a machine tool frame 1 having journalled a vertical main spindle 2 the lower end of which carries a tool 3, for instance a miller head. The upper spindle end, which has been designed as splined shaft, has connected thereto a main drive gear 4 meshing with two identical pinions 5, 6. The upper end of shaft 7, which carries pinion 5, has keyed thereto a gear 8, whereas at the lower end of a shaft 9, carrying pinion 6, there is journalled a gear 10. Gear 8 meshes with a pinion 11 which is keyed to a drive shaft 12 arranged parallel with regard to shafts 7 and 9. The lower end of drive shaft 12 has keyed thereto a pinion 13 meshing with gear 10. Gear 10 is keyed to the hub-shaped portion of one section 14 of a slip clutch, the other section 15 of which is keyed to shaft 9. In conformity with the present invention, the transmission ratio between gears 8 and 11 is slightly different from the transmission ratio between gears 10 and 13. Thus, for instance, the transmission ratio between gears 8 and 11 may be 240:125=1.820, whereas the transmission ratio between gears 10 and 13 may be 238:123=1.935. The speed difference resulting therefrom is compensated for by the slip clutch.

This arrangement brings about that the drive of the main drive gear 4 is effected through the intervention of gears 11, 8 and 5 which are positively connected to the drive shaft 12. Pinion 6, which is driven at a higher transmission ratio and therefore rotates at a lower speed than pinion 5, is forced by gear 4 to rotate as fast as pinion 5. It will be appreciated that as a result thereof, with a rotation of pinion 5 in clockwise direction, flank 16 which is located in front and pertains to pinion 5 (see FIG. 4) engages flank 17 which pertains to the main drive wheel 4, and when looking in the direction of rotation, is located in the back. Flank 18 located in the back and pertaining to the counter-pinion 6 engages the front flank 19 of the main drive wheel 4. As will be evident from FIG. 5, these conditions are reversed with the opposite direction of rotation of the driving pinion 15. In both instances, the flank play has been eliminated. The pre-load acting upon slip clutch 14, 15 has to be merely of such magnitude that with decreasing cutting resistance or with interrupted cut, the counter-wheel 6 will not be rotated by the main drive gear 4 when the latter, in view of the reduction in or the ceasing of the cutting resistance, has the tendency to run ahead in the sense of its direction of rotation and thereby to eliminate the contact of its flank 17 with flank 16 of the driving pinion 5. To this end, slip clutch 14, 15 is interposed between the counter-shaft 9 and with the pair of gears 13, 10 which has the greater transmission ratio, in the above-mentioned example, the transmission ratio 1.935.

A fundamentally similar arrangement is shown in FIG. 6. The main drive gear, in this instance a worm wheel 20, is keyed to spindle 2 and is in mesh with a worm 21 which corresponds to pinion 5 of the embodiment of FIGS. 1 to 5. The pitch of the worm wheel drive 20, 21 is selected so high that a counter-worm 22 which corresponds to gear 6 of the first embodiment, will be turned by worm wheel 20. Worm wheel 21 is keyed to drive shaft 12 the free end of which has keyed thereto a bevel gear 23 which is in permanent mesh with a counter-bevel gear 24 which latter is freely rotatably journalled on the adjacent end of shaft 25 having worm 22 connected thereto. Fixedly connected to counter-bevel gear 24 is one section 14 of a slip clutch, the other section 15 of which is keyed to shaft 25. The pitch circle diameters of the two gears 23, 24 slightly differ from each other and may, for instance respectively amount to 150 millimeters and 151 millimeters. Gear 24, with a diameter of, for instance 151 millimeters, will therefore run at a lower speed than gear 23. Therefore, also the worm 22 which is fixedly connected to gear 24, will have the tendency to rotate at a somewhat lower speed than the driving worm 21. Worm 22, however, is by worm wheel 20 forced to follow the faster rotation of driving worm 21, thereby making possible the slip of clutch 14, 15. This clutch has, similar to the first embodiment, to be pre-loaded only to such an extent that when the cutting resistance is reduced or interrupted, worm wheel 20, which has the tendency to run ahead in the direction of rotation, will not be able to take along slip worm 22.

The third embodiment illustrated in FIGS. 7 and 8 differs from the preceding elements primarily in that the pitch of the worm wheel drive 20, 21 and 22 is low and, more specifically, so low that the drive is self-locking, i.e. the wheel cannot drive the worms. In this instance, in view of the self-locking, the driving worm 21 would run faster than the counter-worm 22. For this reason, the driving worm 21 must now become the slip worm, and the slip-clutch 14, 15 is interposed between worm 21 and drive shaft 12. Slip-clutch 14, 15 compensates the tendency of drive worm 21 to run faster than counter-worm 22. However, slip-clutch 14, 15 must be so arranged that it cannot transmit the total drive torque. FIG. 8 again illustrates how also in this instance the two worms 21, 22 have their offset flanks in engagement with the flanks of the worm gear ring 20 and thereby assure a play-free, or backlash free power transmission. As the slip clutch connection there may be selected any type of slip clutch.

Referring now to the embodiment of FIGS. 9 to 12, main spindle 2 is again rotatably journalled in a machine frame 1. The lower end of main spindle 2 has connected thereto a tool 3. The upper end of main spindle 2, which also in this instance forms a splined shaft, has keyed thereto the main drive wheel which, however, in this instance is formed by two coaxial gear rings 4a and 4b which are rotatable relative to each other and respectively mesh with pinions 5 and 6. The two gear rings, which have the same outer diameter, differ only slightly in their number of teeth. More specifically, the upper gear ring 4b has one more tooth than the lower gear ring 4a, for instance 65 and 64 teeth, respectively. On the other hand, the two pinions 5 and 6 have the same number of teeth, for instance 23, and are keyed to a common shaft 25 which, through the intervention of a gear 26 is driven by a gear 27 keyed to drive shaft 12 of the main spindle 2.

A disc 28 is mounted on the face side of the upper gear ring 4b. By means of disc 28, gear ring 4b is adapted to be axially clamped against the lower gear ring 4a. To this end, the main spindle 2 has keyed thereto a flanged bushing 29, flange 30 of which has by means of stud bolts 31 the lower gear ring 4a connected thereto. The top side of gear ring 4a (see FIG. 10) is provided with a centering surface 32 engaging a centered countersurface 33 at the bottom side of the upper gear ring 4b. The upper end face of the upper gear ring 4b has a corresponding annular surface 36 which cooperates with a counter surface 37 of a disc 28. Disc 28 is by means of a key non-rotatably but axially displaceably connected to and guided on bushing 29 and with play engages a bore 38 of the upper gear ring 4b. Clamping means 39 interposed between disc 28 and the lower gear ring 4a firmly press the upper gear ring 4b against the lower gear ring 4a. With the illustrated embodiment, the clamping means are formed by stud bolts the lower ends of which are screwed into threaded bores 41 of lower gear ring 4a up to collar 40 and with play extend through disc 28. Said stud bolts have their upper ends provided with threads 42 engaged by nuts 43 which, through the intervention of dish-springs 44 located in cutouts 45 of disc 28, press said springs 44 and through the intervention of surfaces 36, 37; 34, 35, the upper gear ring 4b against the lower gear ring 4a. The stud bolts 39 are equally spaced from each other and arranged along a circle which is concentric to main spindle 2 and which is equally spaced from the wall of bushing 29 and the bore 38 of the upper gear ring 4b.

While the driving force for main spindle 2 is conveyed through lower pinion 5 and gear ring 4a, only a considerably lower force is to be passed through upper gear ring 4b and pinion 6, which lower force, in consideration of the frictional force between surfaces 34 to 37 will suffice to prevent tool 3 from springing back when the work resistance varies. The upper gears 6 and 4b can, therefore, be designed thinner in axial direction than the lower gears. The magnitude of the frictional force is adjusted by the clamping screws 39 and nuts 43 which are easily accessible from above.

Similar to the embodiment of FIGS. 1 to 8, the arrangement of FIGS. 9 to 12, in view of the different transmission ratios between pinions 5 and 6 and gear rings 4b and 4a, which are compensated by frictional connections 34, 35 and 35, 37 makes the following possible. When pinion is rotated in counter-clockwise direction, tooth flank 16 (FIG. 11) which lies in front when looking in the direction of rotation of pinion 5, engages in a play-free manner the rear flank 17 of the counter-clockwise rotating gear ring 4a. The upper gear ring 4b which, in view of having one or two more teeth, will have the tendency to rotate at a lower speed than lower gear ring 4a, will, due to the frictional connection with the faster-running lower gear ring, be frictionally urged to run at the same speed as lower gear ring 4a. Consequently, the front flank 19 of the upper gear ring 4b will engage the rear flank 18 of pinion 6 so that a play-free turning of the gears 4a, 4b, 5 and 6 will be assured.

With the embodiment of FIGS. 9 to 12, with the same effect, pinion 6 may be rotatably connected with the body of pinion 5 through a slip-clutch while not being connected to shaft 25, and the gears 4a, 4b may be connected to each other so as not to be rotatable relative to each other. Instead of dish-springs 44, also corresponding strong screw or rubber or metal springs may be employed. The lower gear ring 4a, which does not rotate on bushing 29, may form a part of bushing 29.

The embodiment of FIGS. 13 and 14 illustrates a drive for a horizontal boring mill. According to this embodiment, the boring spindle 101 has mounted thereon a spindle sleeve 102 to which the driving gear 103 is non-rotatably connected by means of screw connections 104. Gear 103 meshes with a pinion 105 which meshes with a further gear 106. Gear 106 has a greater number of teeth than gear 103 and, therefore, when gear 105 is rotated (the rotating means therefor not being shown in the drawing) gear 106 will rotate at a lower speed than main gear 103. The main drive and the braking drive are thus driven by pinion 105.

Gear 106, which as mentioned above, rotates at a different speed than sleeve 102, is journalled on an annular flange 107 of a ring 108 which latter is by means of a key and groove 109 non-rotatably but axially displaceably connected to sleeve 102. That cross-sectional portion of the ring which in the drawing is located on the left-hand side, forms an annular piston 108a which extends into an annular chamber 110. Chamber 110 is formed by a part 111 which may, for instance be connected to the transmission housing. Sealings or gaskets 111a are interposed between the annular piston 108a and part 111.

The arrangement comprises an opening 112 for conveying a hydraulic pressure medium to ring chamber 110. Such pressure medium may be furnished by an oil pump 110′ or may be withdrawn from the transmission housing with or without a control device being interposed therebetween. The pressure of the pressure medium in annular chamber 110 is variable from the outside, i.e. from the control panel of the machine as by a valve 110″ in such a way that ring 108 with its surface 113 will be pressed against one flank (in the drawing, the left flank) of gear 106 with variable force, whereby the oppositely located flank of the gear (the right flank, in the drawing) will be pressed against the surface 114 of sleeve 102. Gear 106, which rotates at a lower speed than sleeve 102 and is adapted yieldably to be clutched to sleeve 102, will thus brake sleeve 102 and ring 108 non-rotatably connected thereto, in conformity with the variable pressure of the pressure medium in chamber 110. The pressure medium will thus be able to control the pressure with which ring 108 is pressed against gear 106, and the slip journalling at the end face 115 of annular piston 108a with regard to the stationary part 111.

Pumping means 110′ may, for example, be a separate pump, or may be a pump in the housing of the transmission in which the spindle is mounted which pump may be variable in pressure.

Preferably, the annular surface 113 is provided with radial lubricating grooves 116 which are evenly distributed over said annular surface. The same or similar lubricating grooves may also be provided on the annular flange 107 and tooth flank 114 which is located opposite surface 113, said lubricating grooves being connected through a passage 117 in ring 108 with an annular chamber 118.

According to the embodiment of FIG. 14, passage 117' has interposed therein a choke 118 through which the pressure medium passes from the annular chamber 110 at low pressure to a recess 116' which may be in the form of radical grooves connected at their inner ends. Recess 116' is open toward the outside, i.e. toward gear 105. Also recess 119 which is located opposite annular groove 116', and recess 120 on flange 7 may be designed as grooves. Recess 119, similar to recess 116' is open toward the outside.

It is, of course, to be understood, that the present invention is, by no means, limited to the particular embodiments referred to above, but also comprises any modifications within the scope of the appended claims. Thus, the above-described and illustrated arrangements may be employed with all other intermediate drives between the work source and the main drive.

What is claimed is:

1. In a backlash free drive arrangement for a machine tool, especially a machine tool for cutting hard metals and ceramics, said machine tool having a spindle, drive means, and two gear trains leading from said drive means to said spindle and having slightly different transmission ratios whereby the play in the respective gear trains is taken up in respectively opposite directions, one of said gear trains forming a positive driving connection from said drive means to said spindle and the other of said gear trains including slip clutch means between said drive means and said spindle whereby to eliminate backlash or play between the drive means and the spindle, each gear train including a main gear on the spindle, said main gears being concentrically arranged on said spindle, one of said main gears being fixedly connected to the spindle and the other of said main gears having a slip connection with the spindle forming the said clip clutch means, and pinion means meshing with said concentrically arranged main gears.

2. In a backlash free drive arrangement for a machine tool, especially a machine tool for cutting hard metals and ceramics, said machine tool having a spindle, drive means, and two gear trains leading from said drive means to said spindle and having slightly different transmission ratios whereby the play in the respective gear trains is taken up in respectively opposite directions, one of said gear trains forming a positive driving connection from said drive means to said spindle and the other of said gear trains including slip clutch means between said drive means and said spindle whereby to eliminate backlash or play between the drive means and the spindle, each said gear train including a main gear on the spindle, said main gears being concentrically arranged on said spindle, one of said main gears being fixedly connected to the spindle and the other of said main gears having a slip connection with the spindle forming the said slip clutch means, and pinion means meshing with said concentrically arranged main gears, said slip connection of said other main gear with the spindle comprising a disc clamping said other main gear to said one main gear.

3. In a backlash free drive arrangement for a machine tool, especially a machine tool for cutting hard metals and ceramics, said machine tool having a spindle, drive means, and two gear trains leading from said drive means to said spindle and having slightly different transmission ratios whereby the play in the respective gear trains is taken up in respectively opposite directions, one of said gear trains forming a positive driving connection from said drive means to said spindle and the other of said gear trains including slip clutch means between said drive means and said spindle whereby to eliminate backlash or play between the drive means and the spindle, each said gear train including a main gear on the spindle, said main gears being concentrically arranged on said spindle, one of said main gears being fixedly connected to the spindle and the other of said main gears having a slip connection with the spindle forming the said slip clutch means, and pinion means meshing with said concentrically arranged main gears, a bushing fixed to the spindle, said one main gear being fixed to said bushing, a disc non-rotatably but axially displaceably mounted on said bushing, the said other of said main gears being in the form of a ring being disposed on said bushing between said one main gear and said disc, and clamping means pressing said disc toward said one main gear for frictionally clamping said other main gear between said disc and said one main gear.

4. In a backlash free drive arrangement for a machine tool, especially a machine tool for cutting hard metals and ceramics, said machine tool having a spindle, drive means, and two gear trains leading from said drive means to said spindle and having slightly different transmission ratios whereby the play in the respective gear trains is taken up in respectively opposite directions, one of said gear trains forming a positive driving connection from said drive means to said spindle and the other of said gear trains including slip clutch means between said drive means and said spindle whereby to eliminate backlash or play between the drive means and the spindle, said spindle comprising the spindle of a boring machine, said gear trains each including a main gear on said spindle, one of said main gears being fixed to said spindle and the other of said main gears being rotatable on the spindle, a shoulder stationary with the spindle on one side of said other main gear, a ring on the other side of said other main gear, and piston and cylinder means connected between the spindle and said ring operable by fluid pressure for frictionally clamping said other main gear between said ring and said shoulder.

5. In a backlash free drive arrangement for a machine tool, especially a machine tool for cutting hard metals and ceramics, said machine tool having a spindle, drive means, and two gear trains leading from said drive means to said spindle and having slightly different transmission ratios whereby the play in the respective gear trains is taken up in respectively opposite directions, one of said gear trains forming a positive driving connection from said drive means to said spindle and the other of said gear trains including slip clutch means between said drive means and said spindle whereby to eliminate backlash or play between the drive means and the spindle, said spindle comprising the spindle of a boring machine, a sleeve fixed to the spindle, said gear trains each including a main gear on said sleeve, one of said main gears being fixed to said sleeve, a shoulder on the sleeve, the other main gear being rotatable on said sleeve adjacent the shoulder, a ring non-rotatably but axially moveably mounted on the sleeve on the side of said other main gear opposite said shoulder, an annular piston portion on said ring, and an annular cylinder on the sleeve receiving said piston portion operable in response to fluid pressure to urge said ring against said other main gear.

6. In a backlash free drive arrangement for a machine tool, especially a machine tool for cutting hard metals and ceramics, said machine tool having a spindle, drive means, and two gear trains leading from said drive means to said spindle and having slightly different transmission ratios whereby the play in the respective gear trains is taken up in respectively opposite directions, one of said gear trains forming a positive driving connection from said drive means to said spindle and the other of said gear trains including slip clutch means between said drive means and said spindle whereby to eliminate backlash or play between the drive means and the spindle, said spindle comprising the spindle of a boring machine, a sleeve fixed to the spindle, said gear trains each including a main gear on said sleeve, one of said main gears being fixed to said sleeve, a shoulder on the sleeve, the other main gear being rotatable on said sleeve adjacent the shoulder, a ring nonrotatably but axially moveably mounted on the sleeve on the side of said other main gear opposite said shoulder, an annular piston portion on said ring, and an annular cylinder on the sleeve receiving said piston portion operable in response to fluid pressure to urge said ring against said other main gear, said ring including a cylindrical portion forming a journal on which said other gear is mounted, and means for conveying lubricating fluid to the sliding surfaces of said other main gear.

7. In a backlash free drive arrangement according to claim 6 in which the means for supplying lubricating fluid to the sliding surfaces of said other main gear include passage means leading from said cylinder through said piston portion and ring and cylindrical portion to said surfaces of said other main gear.

8. In a backlash free drive arrangement according to claim 6 in which pumping means, for example, the lubricant supply pump of the machine tool, is provided connected to the cylinder to supply fluid under pressure to said cylinder.

9. In a backlash free drive arrangement according to claim 6 in which pumping means, for example, the lubricant supply pump of the machine tool is provided connected to the cylinder to supply fluid under pressure to said cylinder, and control valve means in the connection leading from the pumping means to the cylinder.

10. In a backlash free drive arrangement according to claim 6 in which said spindle is mounted in a transmission housing, a variable pressure source of fluid in the housing, and a connection from said source to said cylinder.

References Cited
UNITED STATES PATENTS

| | | | |
|---|---|---|---|
| 1,274,918 | 8/1918 | Maag | 74—409 X |
| 1,570,372 | 1/1926 | Buckingham | 74—409 X |
| 1,738,251 | 12/1929 | Kasley | 74—409 |
| 2,525,945 | 10/1950 | Ricordel | 74—409 |
| 2,717,522 | 9/1955 | Mottu | 74—409 |
| 2,868,028 | 1/1959 | Ziegler | 74—409 |
| 2,889,755 | 6/1959 | Schroeder | 74—409 X |
| 2,902,875 | 9/1959 | Finally et al. | 74—409 |
| 2,949,796 | 8/1960 | Frederick et al. | 74—409 X |
| 2,968,965 | 1/1961 | Swanson et al. | 74—409 |

DAVID J. WILLIAMOWSKY, *Examiner.*

C. J. HUSAR, *Assistant Examiner.*

FRED C. MATTERN, JR., *Primary Examiner.*